United States Patent
Murayama (10) Patent No.: US 10,256,675 B2
(45) Date of Patent: Apr. 9, 2019

(54) POWER-SUPPLYING DEVICE AND WIRELESS POWER SUPPLY SYSTEM

(71) Applicant: IHI CORPORATION, Tokyo (JP)

(72) Inventor: Takahiko Murayama, Tokyo (JP)

(73) Assignee: IHI CORPORATION, Tokyo (JP)

( * ) Notice: Subject to any disclaimer, the term of this patent is extended or adjusted under 35 U.S.C. 154(b) by 237 days.

(21) Appl. No.: 14/837,117

(22) Filed: Aug. 27, 2015

(65) Prior Publication Data

US 2015/0372502 A1 Dec. 24, 2015

Related U.S. Application Data

(63) Continuation of application No. PCT/JP2014/056560, filed on Mar. 12, 2014.

(30) Foreign Application Priority Data

Jun. 4, 2013 (JP) ................. 2013-118199

(51) Int. Cl.

| | |
|---|---|
| *H02J 5/00* | (2016.01) |
| *H02J 50/80* | (2016.01) |
| *H02J 7/02* | (2016.01) |
| *H02J 17/00* | (2006.01) |
| *H02J 50/12* | (2016.01) |
| *H02M 3/28* | (2006.01) |
| *H02M 3/335* | (2006.01) |
| *H02M 1/00* | (2006.01) |

(52) U.S. Cl.
CPC ............. *H02J 50/80* (2016.02); *H02J 7/025* (2013.01); *H02J 17/00* (2013.01); *H02J 50/12* (2016.02); *H02M 3/28* (2013.01); *H02M 3/33515* (2013.01); *H02M 2001/0058* (2013.01); *Y02B 70/1433* (2013.01); *Y02B 70/1491* (2013.01)

(58) Field of Classification Search
CPC ............ H02J 5/005; H02J 50/12; H02J 17/00; H02M 3/28; H02M 3/33515; Y02B 20/1433; Y02B 70/1491
USPC ........................................................ 307/104
See application file for complete search history.

(56) References Cited

U.S. PATENT DOCUMENTS 6,579,315 B1 * 6/2003 Weiss .................... A61M 1/127
607/65
7,282,872 B2 * 10/2007 Ohta .................. H05B 41/2883
315/209 R (Continued)

FOREIGN PATENT DOCUMENTS

| CN | 202206194 U | 4/2012 |
|---|---|---|
| JP | 10-108391 A | 4/1998 |

(Continued)

OTHER PUBLICATIONS

International Search Report, PCT/JP2014/056560, Apr. 22, 2014, 2 pgs.

*Primary Examiner* — Dinh T Le (74) *Attorney, Agent, or Firm* — Volpe and Koenig, P.C.

(57) ABSTRACT

A power-supplying device and a wireless power supply system of the present disclosure include an inverter circuit configured to convert direct current power into alternating current (AC) power, a resonance circuit configured to wirelessly transmit power toward a power-receiving device based on the AC power, and a control unit configured to control the inverter circuit at a switching frequency based on state information of predetermined elements.

8 Claims, 2 Drawing Sheets

(56) References Cited

U.S. PATENT DOCUMENTS

| | | | | |
|---|---|---|---|---|
| 7,291,990 B2* | 11/2007 | Ichikawa | ............ | H05B 41/2883 |
| | | | | 315/291 |
| 8,842,635 B2* | 9/2014 | Kim | .................... | H04B 5/0037 |
| | | | | 370/331 |
| 2016/0064951 A1* | 3/2016 | Yamamoto | .............. | H02J 17/00 |
| | | | | 307/104 |

FOREIGN PATENT DOCUMENTS

| | | | |
|---|---|---|---|
| JP | 2006-074848 | A | 3/2006 |
| JP | 2008-263710 | A | 10/2008 |
| JP | 2009-225551 | A | 10/2009 |
| JP | 2010-166693 | A | 7/2010 |
| JP | 2010-252446 | A | 11/2010 |
| JP | 2011-091882 | A | 5/2011 |
| JP | 2012-023913 | A | 2/2012 |
| JP | 2012-054179 | A | 3/2012 |

\* cited by examiner

POWER-SUPPLYING DEVICE AND WIRELESS POWER SUPPLY SYSTEM

This application is a continuation application based on a PCT Patent Application No. PCT/JP2014/056560, filed on Mar. 12, 2014, whose priority is claimed on Japanese Patent Application No. 2013-118199, filed on Jun. 4, 2013. The contents of both the PCT application and the Japanese Patent Application are incorporated herein by reference.

TECHNICAL FIELD

The present disclosure relates to a power-supplying device and a wireless power supply system.

BACKGROUND ART

In the following Patent Document 1, a wireless power supply system in which a power-supplying device and a power-receiving device can be simplified is disclosed. Because the power-supplying device estimates a distance between a primary self-resonance coil of the power-supplying device and a secondary self-resonance coil of the power-receiving device and controls the supply of power according to the distance in this wireless power supply system, it is not necessary to estimate the above-described distance by performing communication with the power-receiving device. That is, because a communication function is unnecessary, the configuration of the power-supplying device and the power-receiving device can be simplified.

DOCUMENT OF RELATED ART

Patent Document

[Patent Document 1]
Japanese Unexamined Patent Application, First Publication No. 2010-252446

SUMMARY

Technical Problem

In the conventional technology, the power-supplying device is constituted of a plurality of elements such as a resonance coil (the primary self-resonance coil), a resonance capacitor or a reactor used as a filter, but characteristic variation of each product lot in mass production or characteristic variation associated with a temperature change of a usage environment occurs in these elements. Thus, in the conventional technology, characteristics of a circuit change and it is difficult to obtain high power supply efficiency.

The present disclosure is conceived in view of the above-described circumstances, and an object of the present disclosure is to obtain high power supply efficiency.

Solution to Problem

According to the first aspect of the present disclosure, a power-supplying device includes an inverter circuit configured to convert direct current (DC) power into alternating current (AC) power; a resonance circuit configured to wirelessly transmit the power toward a power-receiving device based on the AC power; and a control unit configured to control the inverter circuit at a switching frequency based on state information of predetermined elements.

According to the second aspect of the present disclosure, a wireless power supply system, which includes a power-supplying device having an inverter circuit and a power-supplying coil and a power-receiving device having a power-receiving coil and wirelessly transmits power from the power-supplying coil to the power-receiving coil based on alternating current (AC) power output from the inverter circuit, includes a control unit configured to control the inverter circuit at a switching frequency based on state information of predetermined elements of at least one of the power-supplying device and the power-receiving device.

According to the present disclosure, it is possible to obtain high power supply efficiency because the switching frequency of an inverter circuit realizing maximum power supply efficiency is obtained based on a detection value of at least one of voltages, currents, and temperatures of a capacitor and a coil of one or both of a power-supplying device and a power-receiving device, and the inverter circuit is controlled based on the obtained switching frequency.

DESCRIPTION OF EMBODIMENTS

Hereinafter, embodiments of the present disclosure will be described with reference to the drawings.

First Embodiment

Figure 1:
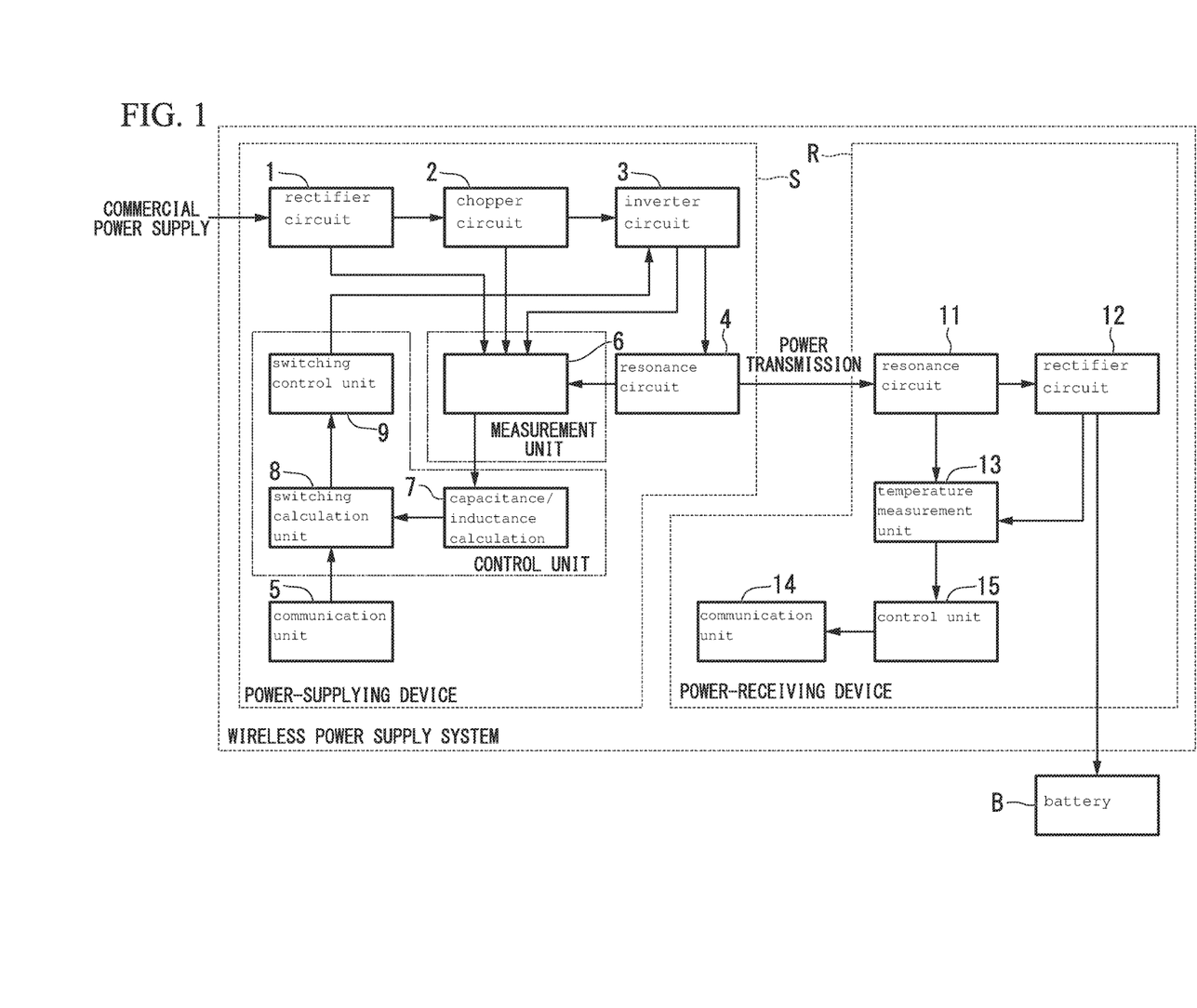
FIG. 1 is a block diagram showing a wireless power supply system according to the first embodiment of the present disclosure.

First, the first embodiment will be described. As shown in FIG. 1, a wireless power supply system according to the first embodiment of the present disclosure includes a power-supplying device S and a power-receiving device R. In addition, as shown, the power-supplying device S includes a rectifier circuit 1, a chopper circuit (voltage converter) 2, an inverter circuit 3, a resonance circuit 4, a communication unit 5, a voltage/current measurement unit 6, a capacitance/inductance calculation unit 7, a switching calculation unit 8, and a switching control unit 9. The power-receiving device R includes a resonance circuit 11, a rectifier circuit 12, a voltage/current measurement unit 13, a communication unit 14, and a control unit 15.

Also, the capacitance/inductance calculation unit 7, the switching calculation unit 8, and the switching control unit 9 constitute a control unit of the power-supplying device side in this embodiment. In addition, the control unit 15 is a control unit of the power-receiving side in this embodiment. In addition, the communication unit 5 is a receiving means in this embodiment. In addition, the communication unit 14 is a transmitting means in this embodiment.

The power-supplying device S is a device disposed to be fixed in a power-supply facility provided on the ground and configured to wirelessly supply a movable body with AC power, and a battery B (load) is supplied with DC power. The power-supplying facility is a facility in which one or more parking spaces of the movable body are provided and includes power-supplying devices S equal in number to parking spaces. The power-receiving device R is a device provided in the movable body and configured to convert AC power supplied from the power-supplying device S into DC power and store the DC power. Also, the movable body is, for example, a vehicle that needs to receive power from outside such as an electric vehicle or a hybrid vehicle.

The rectifier circuit 1 in the power-supplying device S, for example, is a diode bridge that performs full-wave rectification on commercial power (for example, single-phase 100 V, 50 Hz) supplied from the commercial power supply and outputs the rectified power to the chopper circuit 2. Power (full-wave rectification power) supplied from the rectifier circuit 1 to the chopper circuit 2 is a pulsating flow of a single polarity (for example, positive polarity) in which sinusoidal commercial power is folded back at a zero-crossing point.

The switching operation is controlled by the switching control unit 9, so that the chopper circuit 2 adjusts its own output voltage and outputs the adjusted output voltage to the inverter circuit 3. Specifically, the chopper circuit 2 is a boost chopper or buck-boost chopper circuit, and power input from the rectifier circuit 1 is raised or raised/lowered and the raised or raised/lowered voltage is output. An output of the chopper circuit 2 is DC power obtained by sufficiently smoothing full-wave rectification power which is a pulsating flow according to functions of an inductor (coil) and a smoothing capacitor within the chopper circuit 2.

In addition, the switching operation is controlled by the switching control unit 9 and therefore the chopper circuit 2 also functions as a power factor correction circuit (PFC). That is, the chopper circuit 2 extends a conduction interval of a current of full-wave rectification power to improve a power factor by switching the full-wave rectification power based on a zero-crossing point of the full-wave rectification power at a frequency sufficiently higher than that of the full-wave rectification power. Also, a detailed description of a power factor correction principle of the chopper circuit 2 will be omitted here because it is generally well known that the chopper circuit functions as the PFC.

The inverter circuit 3 includes a switching element, a reactor (coil), and a smoothing capacitor, and converts DC power supplied from the chopper circuit 2 into AC power at a specific frequency (transmission frequency) to output the AC power at the specific frequency to the resonance circuit 4 when the switching operation is controlled by the switching control unit 9.

The resonance circuit 4 is a resonance circuit connected to the power-supplying coil and the power-supplying capacitor. The power-supplying coil of the power-supplying coil and the power-supplying capacitor is provided at a position (a position at which the power-receiving coil is provided) facing a specific position of a movable body parked in the parking space. In addition, the resonance frequency of the resonance circuit 4 is set to a frequency close to a driving frequency in the inverter circuit 3.

The communication unit 5 performs near-field wireless communication with the communication unit 14 of the power-receiving device R to acquire state information indicating a state of the power-receiving device R from the communication unit 14. For example, the state information is information indicating inter-terminal voltages and currents of a specific capacitor and a specific coil constituting the resonance circuit 11 or the rectifier circuit 12 provided in the power-receiving device or values of temperatures of the capacitor and the coil. These are examples, and the state information may include other information in a range in which the object of the present disclosure can be achieved.

This communication unit 5 outputs the state information acquired from the communication unit 14 to the switching calculation unit 8. Also, a communication scheme between the communication unit 5 and the communication unit 14 is near-field wireless communication such as ZigBee (registered trademark) or Bluetooth (registered trademark) or near-field optical communication using an optical signal.

The voltage/current measurement unit 6 is an example of a measurement unit. Another example is shown as the measurement unit in the second embodiment to be described below. In the following first embodiment, the voltage/current measurement unit 6 will be described as the measurement unit. The voltage/current measurement unit 6 includes a voltage sensor configured to detect inter-terminal voltages of a specific capacitor and a specific coil and a current sensor configured to detect currents flowing through the specific capacitor and the specific coil described above among capacitors and coils constituting the rectifier circuit 1, the chopper circuit 2, the inverter circuit 3, and the resonance circuit 4 described above. Then, the voltage/current measurement unit 6 outputs a voltage detection signal indicating an inter-terminal voltage detected by the voltage sensor and a current detection signal indicating a current detected by the current sensor to the capacitance/inductance calculation unit 7 included in the control unit. Here, values of the currents and voltages flowing through the coil and the capacitor are examples of the state information output by the voltage/current measurement unit 6 to the control unit. Further, examples of the coil and the capacitor have been described, but, in general, state information of predetermined elements is input to the control unit. That is, according to the above description, there are both a case in which the communication unit 5 receives the state information of the elements of the power-receiving device side from the power-receiving device and a case in which the state information of the elements of the power-supplying device side is input to the control unit.

When the state information, for example, the voltage detection signal and the current detection signal, is input from the voltage/current measurement unit 6, the capacitance/inductance calculation unit 7 calculates the capacitance of the specific capacitor and the inductance of the specific coil described above based on inter-terminal voltages of the specific capacitor and the specific coil in the power-supplying device S indicated by voltage detection signals and currents flowing through the specific capacitor and the specific coil in the power-supplying device S indicated by current detection signals and outputs the calculated capacitance and inductance to the switching calculation unit 8.

The switching calculation unit 8 obtains a switching frequency of the inverter circuit 3 realizing maximum power supply efficiency by executing a calculation process using, as input values, the state information of the power-receiving device R input from the communication unit 5 and the capacitance of the specific capacitor and the inductance of the specific coil input from the capacitance/inductance calculation unit 7, and outputs the obtained switching frequency to the switching control unit 9.

For example, the switching calculation unit 8 pre-stores a data table in which the switching frequency of the inverter circuit 3 realizing the maximum power supply efficiency is registered according to a combination of the capacitance of the specific capacitor and the inductance of the specific coil. Then, the switching calculation unit 8 acquires, from the data table, the switching frequency corresponding to the combination of the capacitance of the specific capacitor and the inductance of the specific coil input from the capacitance/inductance calculation unit 7. Also, the switching frequency of the inverter circuit 3 realizing the maximum power supply efficiency is a switching frequency at which a power factor is maximized, that is, a switching frequency at which phase differences of the voltage and the current are minimized.

The switching control unit 9 controls the inverter circuit 3 based on the switching frequency of the inverter circuit 3 input from the switching calculation unit 8. An example has been described above in which the switching calculation unit 8 included in the control unit obtains the switching frequency realizing the maximum power supply efficiency and the switching control unit included in the control unit controls an inverter at its frequency. However, in the present disclosure, the switching frequency realizing the maximum power supply efficiency is not constantly obtained. If the control unit at least controls the inverter circuit at the switching frequency based on state information of predetermined elements for the inverter circuit converting DC power into AC power, it is possible to solve the problem that "the characteristics of the circuit change due to characteristic variation in mass production and it is difficult to obtain high power supply efficiency in the conventional technology" according to the configuration of the present disclosure. Therefore, it should be noted that the present disclosure is not limited to control for requiring maximum power supply efficiency.

The resonance circuit 11 in the power-receiving device R is a resonance circuit in which a power-receiving coil and a power-receiving capacitor are connected. The power-receiving coil is provided in the bottom, the side, the top, or the like of the movable body, and faces the power-supplying coil of the power-supplying device S in proximity when the movable body has been parked in the parking space.

This resonance circuit 11 is a resonance circuit in which the power-receiving coil and the power-receiving capacitor are connected, and the power-receiving coil is magnetically coupled while facing the power-supplying coil of the resonance circuit 4 in proximity. As a result, the resonance circuit 11 wirelessly receives AC power which is supplied by the inverter circuit 3 to the power-supplying coil and is subject to a coupling coefficient between the power-supplying coil and the power-receiving coil from the resonance circuit 4, and outputs the received AC power to the rectifier circuit 12. That is, the wireless power supply system of the present disclosure is configured as a wireless power supply system based on an electromagnetic induction scheme or a magnetic-field resonance scheme.

The rectifier circuit 12, for example, includes a diode bridge, a reactor (coil) and a smoothing capacitor, performs full-wave rectification and smoothing on AC power (received power) supplied from the resonance circuit 11, and outputs the rectified and smoothed power to the battery B. The power supplied from the rectifier circuit 12 to the battery B is DC power obtained by smoothing the full-wave rectification power obtained through the full-wave rectification by the diode bridge using the reactor and the smoothing capacitor.

The voltage/current measurement unit 13 includes a voltage sensor configured to detect inter-terminal voltages of a specific capacitor and a specific coil constituting the resonance circuit 11 and the rectifier circuit 12 described above and a current sensor configured to detect currents flowing through the specific capacitor and the specific coil, and outputs a voltage detection signal indicating the inter-terminal voltage detected by the voltage sensor and a current detection signal indicating the current detected by the current sensor to the control unit 15.

The communication unit 14 performs near-field wireless communication with the communication unit 5 of the power-supplying device S to transmit the state information indicating the state of the power-receiving device R. For example, the state information is information indicating the capacitance and inductance of the specific capacitor and the specific coil (calculated by the control unit 15 to be described below) from which inter-terminal voltages and currents are detected by the voltage/current measurement unit 13. Similar to the communication unit 5, the communication unit 14 performs radio wave communication such as ZigBee (registered trademark) or Bluetooth (registered trademark) or optical communication using an optical signal. Also, the voltage/current measurement unit 13 is an example of the measurement unit provided in the power-receiving side. In the second embodiment to be described below, another example of the measurement unit of the power-receiving side will be described.

The control unit 15 controls the power-receiving device R as a whole based on a calculation process, for example, calculates the capacitance of the specific capacitor and the inductance of the specific coil based on the voltage detection signal and the current detection signal input from the voltage/current measurement unit 13, and causes the communication unit 14 to transmit the capacitance and the inductance as the state information of the power-receiving device R.

The battery B is a secondary battery such as a lithium ion battery and is charged with DC power supplied from the rectifier circuit 12 to store the DC power. Although not shown, this battery B is connected to an inverter circuit (traction inverter circuit) configured to drive a traction motor of the movable body or/and a control device configured to control running of the movable body, and supplies the driving power to the running inverter circuit or control device.

Next, an operation of the wireless power supply system configured as described above will be described.

When the movable body enters the parking space, the wireless power supply system of the present disclosure starts to supply power to the movable body. For example, the communication unit 5 of the power-supplying device S continuously transmits a communication request signal in a given cycle. When the movable body enters the parking space, it is possible to receive the communication request signal, and the communication unit 14 of the power-receiving device R transmits a response signal for the communication request signal to the communication unit 5. Then, when the response signal is received, the communication unit 5 notifies the switching control unit 9 of the reception of the response signal. As a result, the switching control unit 9 determines (recognizes) that the movable body has entered an area in which power supply is possible.

Then, when it is determined that the movable body has entered the area in which the power supply is possible, the switching control unit 9 starts to drive the chopper circuit 2 and the inverter circuit 3. As a result, wireless power supply from the resonance circuit 4 of the power-supplying device S to the resonance circuit 11 of the power-receiving device R is started.

Then, when the voltage detection signal and the current detection signal are input from the voltage/current measurement unit 6 in association with the start of the power-supplying operation, the capacitance/inductance calculation unit 7 of the power-supplying device S calculates the capacitance of the specific capacitor and the inductance of the specific coil described above based on inter-terminal voltages of the specific capacitor and the specific coil in the power-supplying device S indicated by voltage detection signals and currents flowing through the specific capacitor and the specific coil in the power-supplying device S indicated by current detection signals and outputs the calculated capacitance and inductance to the switching calculation unit 8.

Then, the switching calculation unit 8 obtains a switching frequency of the inverter circuit 3 realizing maximum power supply efficiency by executing a calculation process using, as input values, the capacitance of the specific capacitor and the inductance of the specific coil input from the capacitance/inductance calculation unit 7, and outputs the obtained switching frequency to the switching control unit 9.

Here, the switching calculation unit 8 acquires, from the data table, the switching frequency corresponding to the combination of the capacitance of the specific capacitor and the inductance of the specific coil input from the capacitance/inductance calculation unit 7, and outputs the acquired switching frequency to the switching control unit 9. Also, the switching frequency of the inverter circuit 3 realizing the maximum power supply efficiency is a switching frequency at which a power factor is maximized. Here, the maximum may be regarded as a value within a given range reflecting an error of measurement or control.

The switching control unit 9 controls the inverter circuit 3 based on the switching frequency of the inverter circuit 3 input from the switching calculation unit 8. As a result, the power factor in the power-supplying device S is improved and the power supply efficiency is improved.

In addition, although the switching calculation unit 8 obtains the switching frequency of the inverter circuit 3 based on the capacitance of the specific capacitor and the inductance of the specific coil in the power-supplying device S input from the capacitance/inductance calculation unit 7 in the operation, the present disclosure is not limited thereto. For example, the switching calculation unit 8 may calculate the switching frequency of the inverter circuit 3 realizing the maximum power supply efficiency based on the capacitance of the specific capacitor and the inductance of the specific coil of the power-receiving device R indicated by the state information of the power-receiving device R input from the communication unit 5 in addition to the capacitance of the specific capacitor and the inductance of the specific coil in the power-supplying device S input from the capacitance/inductance calculation unit 7.

Here, the switching calculation unit 8 may pre-store a data table and acquire, from the data table, the switching frequency corresponding to a combination of the capacitance of the specific capacitor and the inductance of the specific coil in the power-supplying device S and of the capacitance of the specific capacitor and the inductance of the specific coil in the power-receiving device R when the capacitance of the specific capacitor and the inductance of the specific coil in the power-supplying device S are input from the capacitance/inductance calculation unit 7 and the state information of the power-receiving device R is input from the communication unit 5.

In addition, the switching calculation unit 8 may calculate the switching frequency of the inverter circuit 3 realizing the maximum power supply efficiency based on the capacitance of the specific capacitor and the inductance of the specific coil indicated by state information of the power-receiving device R input from the communication unit 5 instead of the capacitance of the specific capacitor and the inductance of the specific coil in the power-supplying device S input from the capacitance/inductance calculation unit 7 in the above-described operation.

Here, the switching calculation unit 8 may also pre-store a data table and acquire, from the data table, a switching frequency corresponding to a combination of the capacitance of the specific capacitor and the inductance of the specific coil in the power-receiving device R indicated by the state information when the state information of the power-receiving device R is input from the communication unit 5.

According to this embodiment, the switching frequency of the inverter circuit realizing the maximum power supply efficiency is obtained based on detection values of the voltages and currents of the capacitor and the coil of at least one of the power-supplying device S and the power-receiving device R, and the inverter circuit is controlled based on the obtained switching frequency. Consequently, it is possible to obtain high power supply efficiency even when characteristics of a circuit change due to characteristic variations of the capacitor and coil in manufacturing.

Second Embodiment

Next, a wireless power supply system according to the second embodiment of the present disclosure will be described.

Figure 2:
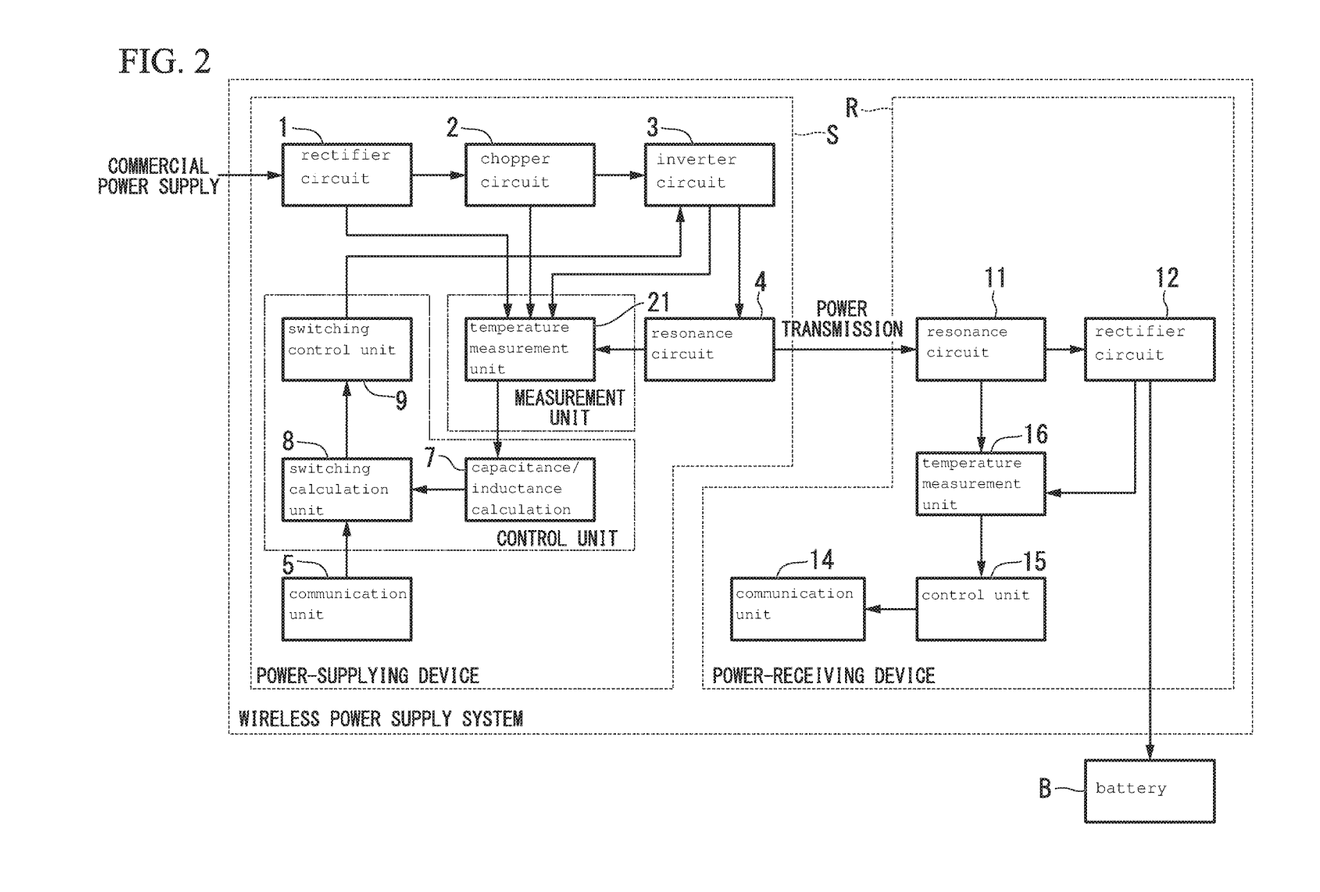
FIG. 2 is block diagram showing a functional configuration of a wireless power supply system according to the second embodiment of the present disclosure.

As shown in FIG. 2, a power converting device according to the second embodiment of the present disclosure includes a power supply temperature measurement unit 21 instead of the voltage/current measurement unit 6 and a power reception temperature measurement unit 16 instead of the voltage/current measurement unit 13, and is different from that of the first embodiment in that operations of a capacitance/inductance calculation unit 7 and a control unit 15 are different. The other components are similar to those of the first embodiment. Consequently, description of the similar components to the first embodiment will be omitted in the second embodiment.

The power supply temperature measurement unit 21 is a temperature sensor provided in the vicinity of a specific capacitor and a specific coil constituting a rectifier circuit 1, a chopper circuit 2, an inverter circuit 3, and a resonance circuit 4 described above and configured to detect a temperature, and outputs a temperature detection signal indicating the temperature to the capacitance/inductance calculation unit 7.

When temperature detection signals are input from the power supply temperature measurement unit 21, the capacitance/inductance calculation unit 7 calculates the capacitance of the specific capacitor and the inductance of the specific coil based on the temperatures of the specific capacitor and the specific coil in a power-supplying device S indicated by the temperature detection signals, and outputs the calculated capacitance and inductance to a switching calculation unit 8.

For example, the switching calculation unit 8 pre-stores the data table in which the capacitance of the specific capacitor and the inductance of the specific coil are registered according to the temperatures detected by the power supply temperature measurement unit 21 and acquires the capacitance of the specific capacitor and the inductance of the specific coil corresponding to the temperatures indicated by the temperature detection signals when the temperature detection signals are input from the power supply temperature measurement unit 21.

The power reception temperature measurement unit 16 is a temperature sensor provided in the vicinity of the specific capacitor and the specific coil constituting a resonance circuit 11 and a rectifier circuit 12 described above and configured to detect the temperature, and outputs a temperature detection signal indicating the temperature to the control unit 15.

The control unit 15 controls a power-receiving device R as a whole based on the calculation process, and, for example, calculates the capacitance of the specific capacitor and the inductance of the specific coil in the power-receiving device R based on the temperature detection signals input from the power reception temperature measurement unit 16 as the capacitance/inductance calculation unit 7 does and causes a communication unit 14 to transmit the capacitance and the inductance as the state information of the power-receiving device R.

Next, an operation of this second embodiment configured as described above will be described. Also, description of a similar operation to the first embodiment will be omitted in the second embodiment.

First, when it is determined that a movable body has entered an area in which power supply is possible, a switching control unit 9 starts to drive the chopper circuit 2 or the inverter circuit 3. As a result, wireless power supply from the resonance circuit 4 of the power-supplying device S to the resonance circuit 11 of the power-receiving device R is started.

Then, when temperature detection signals are input from the power supply temperature measurement unit 21 in association with the start of the power-supplying operation, the capacitance/inductance calculation unit 7 of the power-supplying device S calculates the capacitance of the specific capacitor and the inductance of the specific coil described above based on temperatures of the specific capacitor and the specific coil in the power-supplying device S indicated by the temperature detection signals, and outputs the calculated capacitance and inductance to the switching calculation unit 8.

Here, the capacitance/inductance calculation unit 7 acquires the capacitance and the inductance corresponding to the temperatures of the specific capacitor and the specific coil in the power-supplying device S indicated by the temperature detection signals input from the power supply temperature measurement unit 21, and outputs the acquired capacitance and inductance to the switching calculation unit 8.

Then, the switching calculation unit 8 obtains a switching frequency of the inverter circuit 3 realizing maximum power supply efficiency by executing a calculation process using, as input values, the capacitance of the specific capacitor and the inductance of the specific coil input from the capacitance/inductance calculation unit 7, and outputs the obtained switching frequency to the switching control unit 9.

Here, the switching calculation unit 8 acquires, from the data table, the switching frequency corresponding to the combination of the capacitance of the specific capacitor and the inductance of the specific coil input from the capacitance/inductance calculation unit 7, and outputs the acquired switching frequency to the switching control unit 9. Also, the switching frequency of the inverter circuit 3 realizing the maximum power supply efficiency is a switching frequency at which a power factor is maximized.

Then, the switching control unit 9 controls the inverter circuit 3 based on the switching frequency of the inverter circuit 3 input from the switching calculation unit 8. As a result, the power factor in the power-supplying device S is improved and the power supply efficiency is improved.

In addition, although the switching calculation unit 8 obtains the switching frequency of the inverter circuit 3 based on the capacitance and the inductance of the specific capacitor and of the specific coil in the power-supplying device S input from the capacitance/inductance calculation unit 7 in the above-described operation, the present disclosure is not limited thereto. For example, the switching calculation unit 8 may calculate the switching frequency of the inverter circuit 3 realizing the maximum power supply efficiency based on the capacitance of the specific capacitor and the inductance of the specific coil of the power-receiving device R indicated by the state information of the power-receiving device R input from the communication unit 5 in addition to the capacitance of the specific capacitor and the inductance of the specific coil in the power-supplying device S input from the capacitance/inductance calculation unit 7.

In addition, the switching calculation unit 8 may calculate the switching frequency of the inverter circuit 3 realizing the maximum power supply efficiency based on the capacitance of the specific capacitor and the inductance of the specific coil indicated by state information of the power-receiving device R input from the communication unit 5 instead of the capacitance of the specific capacitor and the inductance of the specific coil in the power-supplying device S input from the capacitance/inductance calculation unit 7 in the above-described operation.

According to this embodiment, the switching frequency of the inverter circuit realizing the maximum power supply efficiency is obtained based on detection values of the voltages and the currents of the capacitor and the coil of at least one of the power-supplying device S and the power-receiving device R, and the inverter circuit is controlled based on the obtained switching frequency. Consequently, it is possible to obtain high power supply efficiency even when characteristics of a circuit change due to characteristic variations of the capacitor and the coil in manufacturing.

Also, the present disclosure is not limited to the above-described embodiments and, for example, the following variant examples are considered.

(1) Although the capacitance of a specific capacitor and the inductance of a specific coil are calculated based on inter-terminal voltages and currents or temperatures of the specific capacitor and the specific coil of one or both of the power-supplying device S and the power-receiving device R and a switching frequency of the inverter circuit 3 realizing maximum power supply efficiency is obtained based on the capacitance and inductance in the above-described embodiments, the present disclosure is not limited thereto. For example, a data table in which the inter-terminal voltages and the currents or the temperatures of the specific capacitor and the specific coil are associated with the switching frequency of the inverter circuit 3 realizing the maximum power supply efficiency may be pre-stored and the switching frequency of the inverter circuit 3 realizing the maximum power supply efficiency corresponding to detection values of the inter-terminal voltages and the currents or the temperatures may be acquired.

(2) Although the switching frequency of the inverter circuit 3 realizing the maximum power supply efficiency has been obtained using detection values of the inter-terminal voltages and the currents or the temperatures of the specific capacitor and the specific coil in the above-described embodiments, all the inter-terminal voltages, the currents, and the temperatures may be used. For example, the capacitance/inductance calculation unit 7 obtains the capacitance of the specific capacitor and the inductance of the specific coil based on the detection values of the inter-terminal voltages, the currents, and the temperatures of the specific capacitor and the specific coil.

(3) Although the capacitance of the specific capacitor and the inductance of the specific coil are calculated in the power-receiving device R and the capacitance and the inductance are transmitted to the power-supplying device S in the above-described embodiments, the present disclosure is not limited thereto. For example, detection values of inter-terminal voltages and currents or temperatures are transmitted from the power-receiving device R to the power-supplying device S. Then, the power-supplying device S calculates the capacitance of the specific capacitor and the inductance of the specific coil in the power-receiving device R based on the detection values of the inter-terminal voltages and the currents or the temperatures from the power-receiving device R.

(4) Although the chopper circuit 2 has a power factor correction function of the rectifier circuit 1 in the above-described embodiment, this power factor correction function may be omitted.

(5) Although a wireless power supply system based on a magnetic-field resonance scheme has been described in the above-described embodiment, the present disclosure is not limited thereto. The present disclosure is also applicable to the electromagnetic induction scheme. In addition, although the load is the battery B in the above-described embodiment, the load in the present disclosure is not limited to the battery B and includes various power storage devices and various types of devices for performing predetermined functions by receiving the supply of power.

(6) Although an example in which the voltage converter is a chopper circuit has been described in the above-described embodiment, the voltage converter is not limited to a non-insulation type DC-DC converter using the chopper circuit. For example, it is also possible to implement a voltage converter in an insulation type DC-DC converter using a transformer or the like.

(7) Although a power supply for supplying power to the power-supplying device S has been described as a commercial power supply of AC in the above-described embodiment, the present disclosure is not limited to this form. For example, the power-supplying device S can receive power from the DC power supply. Because the DC power supply can output the DC voltage, the rectifier circuit for converting an AC voltage into a DC voltage may be omitted in the form in which the DC power supply is adopted. Although the chopper circuit is used when the output from the DC power supply is converted into a desired DC voltage, the chopper circuit can also be omitted when the output of the DC power supply itself is a desired voltage.

INDUSTRIAL APPLICABILITY

A power-supplying device, a power-receiving device, and a wireless power supply system of the present disclosure can obtain high power-supplying efficiency.

The invention claimed is:

1. A power-supplying device comprising:
an inverter circuit that converts direct current (DC) power into alternating current (AC) power, wherein the inverter circuit includes a switching element, an inverter capacitor and an inverter coil;
a resonance circuit that is connected to the inverter circuit and wirelessly transmits power toward a power-receiving device based on the AC power, wherein the resonance circuit includes a resonance capacitor and a resonance coil; and
a control unit communicatively coupled to the inverter circuit that controls the switching element at a switching frequency based on state information of predetermined elements,
wherein the predetermined elements are either (A) the inverter capacitor and the inverter coil or (B) the resonance capacitor and the resonance coil; and
wherein the state information is at least one of (X) values of temperatures of the predetermined elements and (Y) values of currents and voltages of the predetermined elements.

2. The power-supplying device according to claim 1, wherein the switching frequency is a frequency at which power supply efficiency for the power-receiving device is maximized.

3. The power-supplying device according to claim 1, wherein the control unit further calculates an inductance value of the coil and a capacitance value of the capacitor from the state information and determines the switching frequency based on the inductance value and the capacitance value.

4. The power-supplying device according to claim 3, wherein the control unit further stores a data table in which the inductance value and the capacitance value are associated with the switching frequency at which power supply efficiency for the power-receiving device is maximized.

5. The power-supplying device according to claim 1, wherein the control unit further stores a data table in which the values of the voltages and the currents are associated with the switching frequency at which power supply efficiency for the power-receiving device is maximized.

6. The power-supplying device according to claim 1, wherein the control unit stores a data table in which the values of temperatures are associated with the switching frequency at which power supply efficiency for the power-receiving device is maximized.

7. A power-supplying device comprising:
an inverter circuit that converts direct current (DC) power into alternating current (AC) power, wherein the inverter circuit includes a switching element, an inverter capacitor and an inverter coil;
a power-supplying side resonance circuit that is connected to the inverter circuit and wirelessly transmits power toward a power-receiving device based on the AC power, wherein the power-receiving device includes a power-receiving side resonance circuit that has a resonance capacitor and a resonance coil and a rectifier circuit that has a rectifier capacitor and a rectifier coil;
a communication unit that receives state information of predetermined elements;
a control unit that controls the switching element of the inverter circuit at a switching frequency based on the state information,
wherein the predetermined elements are either (A) the resonance capacitor and the resonance coil or (B) the rectifier capacitor and the rectifier coil, and
wherein the state information is values based on at least one of (X) values of temperature of the predetermined elements and (Y) values of currents and voltages of the predetermined elements.

8. A power-supplying device comprising:
a rectifier circuit to be connected to a commercial power supply;
a voltage converter connected to the rectifier circuit, wherein the voltage converter includes a converter capacitor and a converter coil;

an inverter circuit that converts direct current (DC) power into alternating current (AC) power from the voltage converter, wherein the inverter circuit includes an inverter capacitor and an inverter coil;

a resonance circuit connected to the inverter circuit and configured to wirelessly transmit the power toward a power-receiving device based on the AC power, wherein the resonance circuit includes a resonance capacitor and a resonance coil; and a control unit that controls a switching element of the inverter circuit at a switching frequency based on state information of predetermined elements, wherein the predetermined elements are either:

(A) the converter capacitor and the converter coil,
(B) the inverter-capacitor and the inverter coil, or
(C) the resonance capacitor and the resonance coil;

wherein the state information is at least one of (X) values of temperatures of the predetermined elements and (Y) values of currents and voltages of the predetermined elements.

* * * * *